United States Patent [19]

Levasseur

[11] Patent Number: 4,593,717
[45] Date of Patent: Jun. 10, 1986

[54] VALVE

[76] Inventor: Joseph E. Levasseur, P.O. Box 25163, Richmond, Va. 23260

[21] Appl. No.: 522,563

[22] Filed: Aug. 12, 1983

[51] Int. Cl.⁴ .................... F16K 37/00; F16K 11/085
[52] U.S. Cl. ............................ 137/556.6; 137/625.41; 137/625.42; 137/625.47; 251/297
[58] Field of Search .......... 137/625.4, 625.41, 625.42, 137/625.46, 625.47, 556, 556.6; 251/297

[56] References Cited

U.S. PATENT DOCUMENTS

| | | | |
|---|---|---|---|
| 944,598 | 12/1908 | Caskey | 137/625.41 |
| 2,680,455 | 6/1954 | Raiteri | 137/625.41 |
| 3,048,192 | 8/1962 | Murphy, Jr. | 137/625.47 |
| 3,115,896 | 12/1963 | Roberts et al. | 251/297 |
| 3,157,201 | 11/1964 | Littmann | 137/625.47 |
| 3,238,968 | 3/1966 | Pecis | 137/556 |
| 3,385,321 | 5/1968 | Ehrens et al. | 251/297 |
| 3,586,049 | 6/1971 | Adamson | 137/625.41 |
| 3,633,621 | 1/1972 | Myers | 251/297 |
| 3,678,960 | 7/1972 | Leibinsohn | 137/625.47 |
| 4,219,021 | 8/1980 | Fink | 137/625.41 |

FOREIGN PATENT DOCUMENTS

| | | | |
|---|---|---|---|
| 495795 | 6/1954 | Italy | 137/625.47 |
| 1188005 | 4/1970 | United Kingdom | 137/625.47 |

Primary Examiner—Alan Cohan
Assistant Examiner—John A. Rivell
Attorney, Agent, or Firm—Lalos, Keegan, Marsh, Bentzen & Kaye

[57] ABSTRACT

The disclosure relates to a four-way valve, incorporating a fail-safe pivotal valve stem, a finger knob indicating simultaneously both closed and opened ports, and three connector fittings oriented in a Y configuration about the centrally located valve stem body for connection with various types of tubing or catheters. A number of channels bored into the valve stem are oriented to connect various ports within the valve housing in a number of combinations depending on the valve stem position. Detent means are provided to lock the valve stem in a selected position and prevent inadvertent opening or closing of a selected port or ports.

18 Claims, 17 Drawing Figures

VALVE

BACKGROUND AND DISCUSSION OF THE INVENTION

The present invention relates to devices for interconnecting fluid carrying tubing utilized with life-support and/or monitoring systems for the patient or for experimental laboratory animal in biology and medicine.

Currently, such a representative device is a disposable three-way stopcock with port orientation 90° and 180° to one another. It is not, however, a precision coupler. While it suitably serves the purpose in some instances, it leaves much to be desired in a number of applications. For example, it clearly has become the poorest link in modern high fidelity recording and monitoring systems wherein maximum efficiency in hemodynamic data gathering is of utmost importance. Minor disturbances can adversely affect the accuracy of such recording and monitoring systems. The entrapment of air bubbles in a 90° angulated conduit has a high probability of occurrence and hampers efficient pressure transmission. When blood pressure is being monitored, the air bubbles generally alter the pressure signal by producing damping and distortion of the pressure wave form. Additionally, because the stopcock is constructed with generally opaque materials, complete removal of bubbles by prior vigorous flushing with a physiological fluid can seldom be ascertained with satisfactory certainty.

The conventional three-way stopcock is a simple but also an awkward design. When in actual use, the stopcock assembly assumes an array of 3 tubings connected at right angles to one another. Moreover, while the handle of the stopcock is usually marked to indicate which tubing is shut off, clinical and laboratory experience has shown that it remains often difficult to verify at a glance which flowthrough system is in operation. Additionally, the right angle orientation of the connector ends does not lend itself as a visual reminder that the female connectors are generally intended to conduct fluid into the stopcock while the male connector serves as the exit port.

Accordingly, it is the primary object of this present invention to provide a novel four-way valve for use in biology and medicine.

Another object is to provide a novel four-way valve with its end connectors designed to provide a more direct pathway across the coupler (valve) consequently eliminating the trapping of air bubbles and the accompanied loss in monitored pressure response.

An additional object of the present invention is to provide a valve design so that any professional or technical operator can easily identify the two female connectors as generally being intended as input ports at one end of the valve body and the male connector as the singular output port at the opposite end.

A further object of the present invention is to provide a fail-safe valve stem against leaks due to either excessive pressure or forced-turning of the valve stem handle against a "dead-stop".

Another object of the present invention is to provide a four-way valve which clearly identifies not only the port closed to fluid movement, but which also simultaneously indicates the conduit which is opened.

Still another object of the present invention is to provide a valve with a clear transparent structure for direct visual observation of the interconnecting ports.

A further object of the present invention is to provide a four-way valve which is economically feasible for disposal after a single use, particularly in a clinical environment, yet durable enough for repeated use in non-clinical applications.

Other objects and advantages of the present invention will become more apparent to those experienced in the use of stopcocks in the art to which pertains the present invention from the following description of the preferred embodiment written in conjunction with the accompanying drawings.

DETAILED DESCRIPTION OF THE PREFERRED EMBODIMENT

Figure 1:
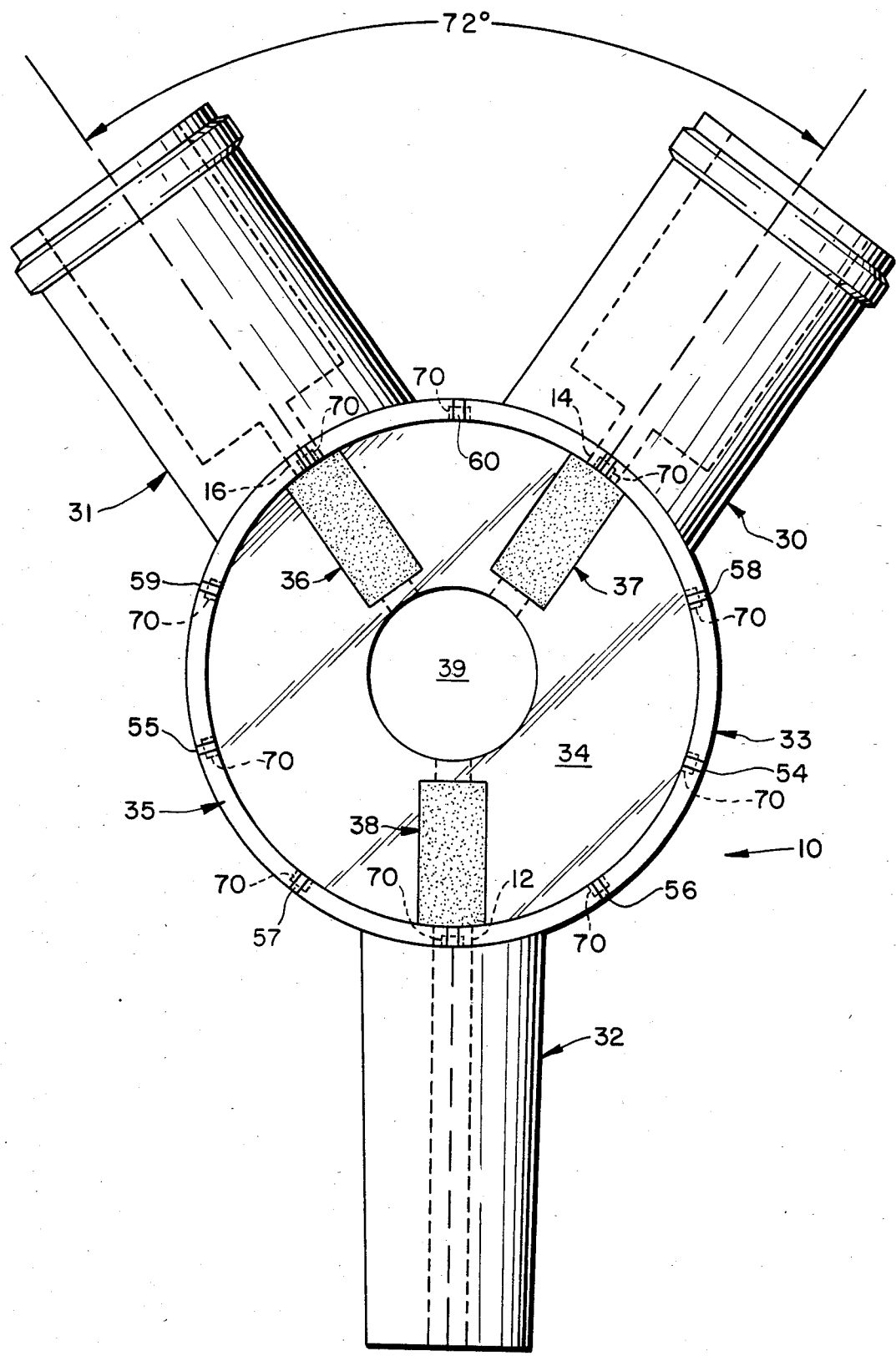
FIG. 1 is a diagrammatic representation of the four-way valve body.

Referring now to FIG. 1, valve 10 includes a valve body 33 made of transparent polycarbonate thermoplastic, thus giving this structural component exceptionally high impact, tensile, shear and flexual strength. The two Luer-Lock female connector ends 30 and 31 are separated by an angle of 72°. Male connector end 32 is located equidistantly, as measured by an arc of 144°, between each of the two female connectors. Valve body or housing 33 defines spaced ports 12, 14, and 16 to communicate respectively with connectors 32, 30, and 31. In this manner the ports have the same angular spacing about housing 33 as their corresponding connectors. The centrally located valve body 33 is a hollow cylinder in design, defining a countersunk bore having one face 34 which is recessed to provide an annular wall or flange 35 at the periphery. Portions of face 34 overlying the three conduits or ports within valve body 33 are further recessed in a rectangular manner at 36, 37, 38, and filled with a (curable) red marker medium. The centrally located bore 39 receives a valve stem 18 in a pressed-fitted manner.

Figure 2:
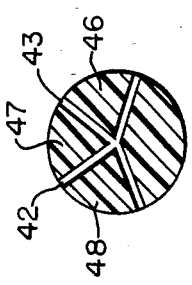
FIG. 2 is schematic diagram of the valve stem.
Figure 2A:
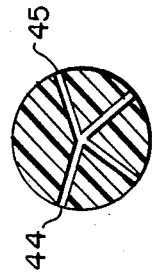
FIG. 2A is the stem of FIG. 2 rotated 90°.
Figure 2B:
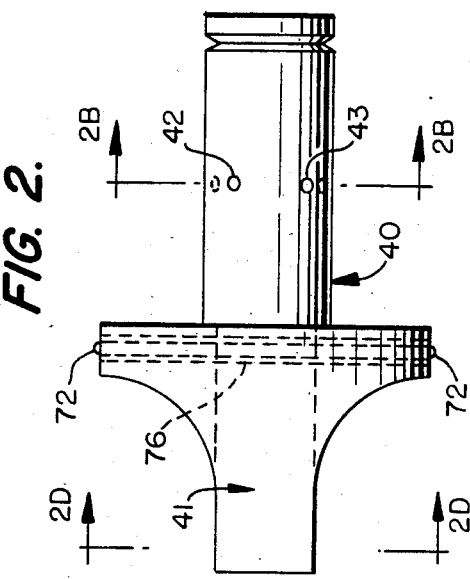
FIGS. 2B and 2C are cross-sections of FIGS. 2 and 2A taken along lines 2B—2B and 2C—2C respectively.
Figure 2C:
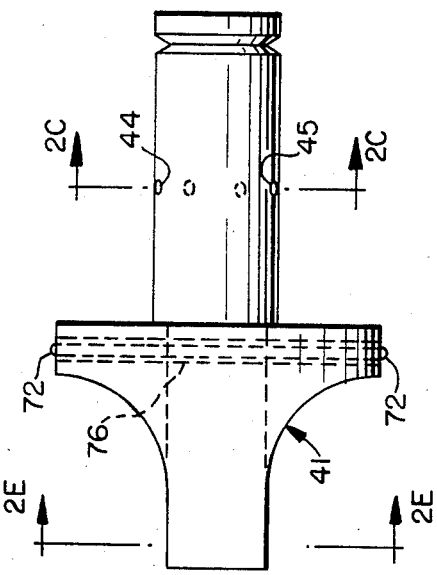
Figure 2D:
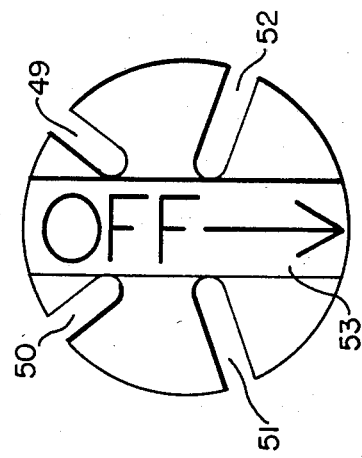
FIGS. 2D-2E are cross-sections of FIGS. 2 and 2A taken along lines 2D—2D and 2E—2E respectively.
Figure 2E:
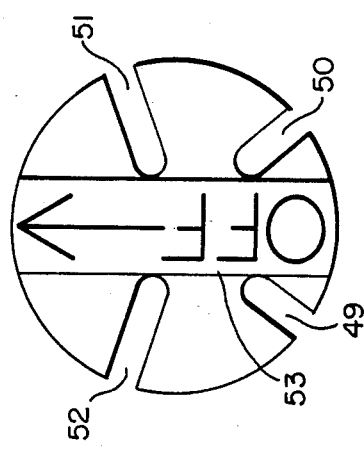
Figure 3:
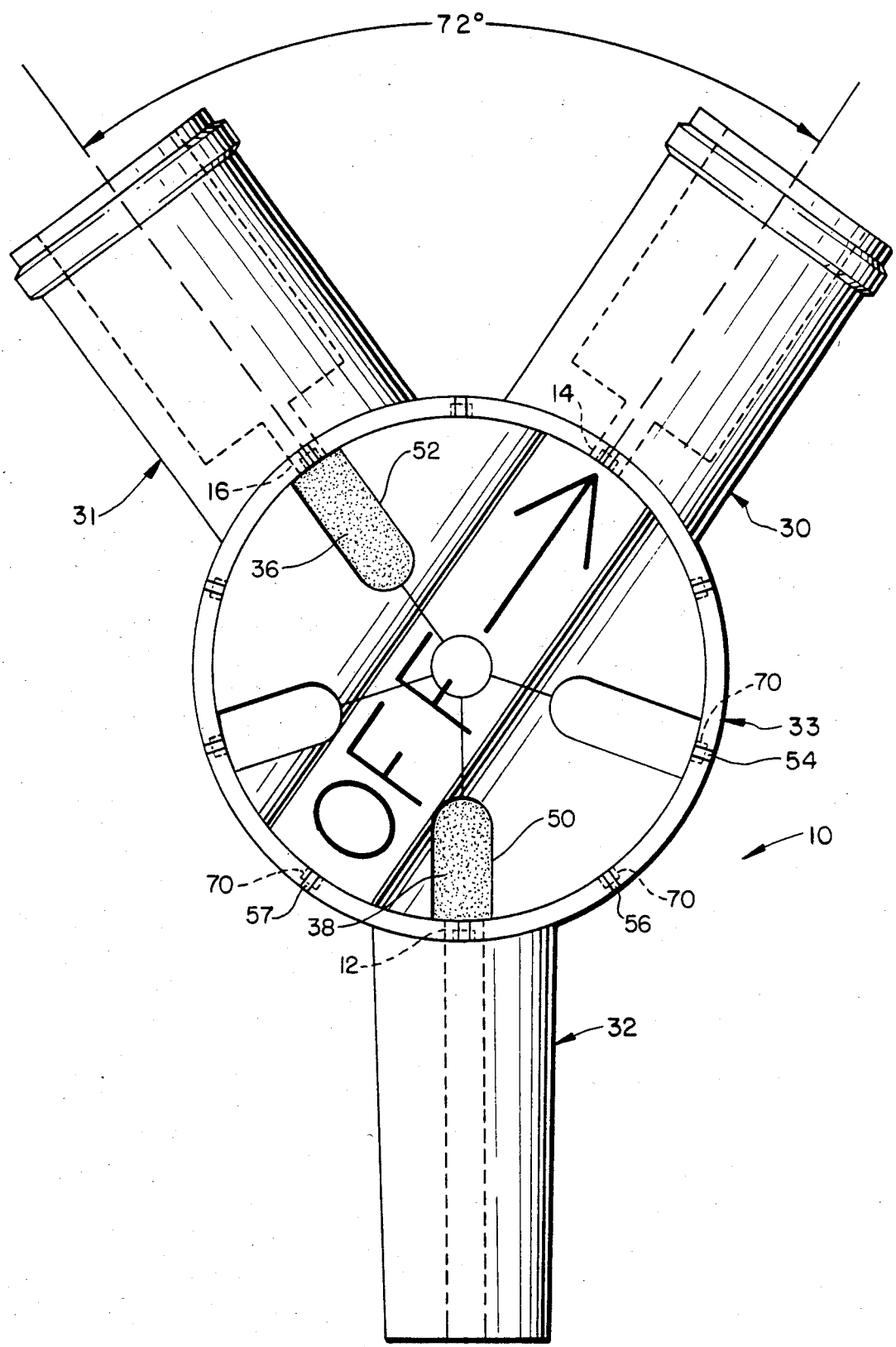
FIGS. 3-5 illustrate the three positions of the valve stem for providing each of the three singly directed flows commonly provided by the conventional three-way stopcock.

The valve stem consists of the stem proper 40 and the finger-handle knob 41 as shown in FIG. 3. The bored holes or channels 42 and 43 are directed centrally to the stem's axis where they communicate with other bored holes or channels 44 and 45. The three arcs 46, 47 and 48 separating the channels are equal to one another, each being formed by an angle of 72°. The face of the finger-handle 41, shown in the left in FIGS. 2D and 2E, has four cut-out portions or slots 49, 50, 51 and 52 which coincide in angular degrees to the channels 42, 43, 44 and 45 in valve stem 40. Additionally, end face 53 of the finger-handle knob 41 is imprinted in black with the word OFF, followed by an arrow in the direction shown.

Figure 4:
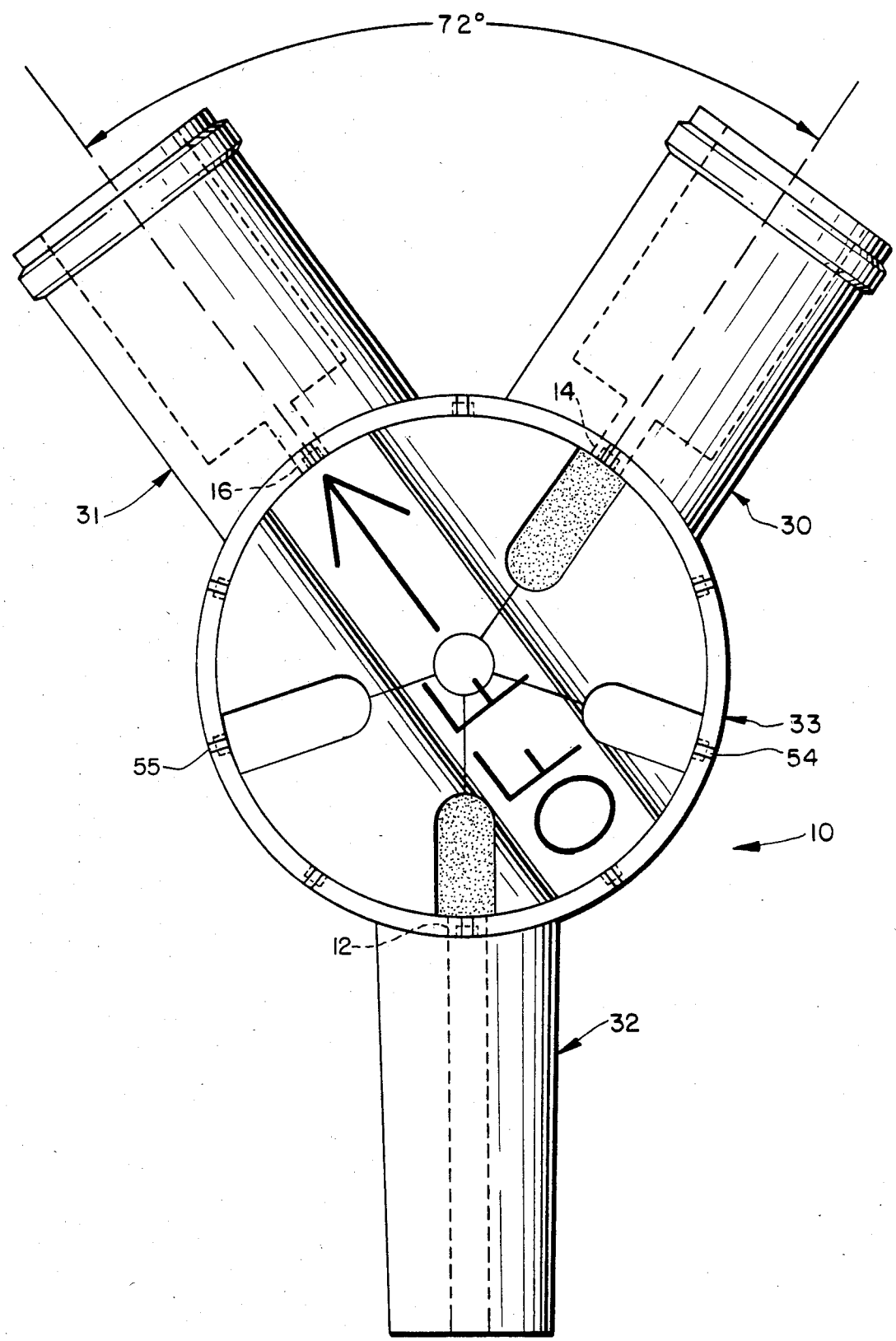
Figure 5:
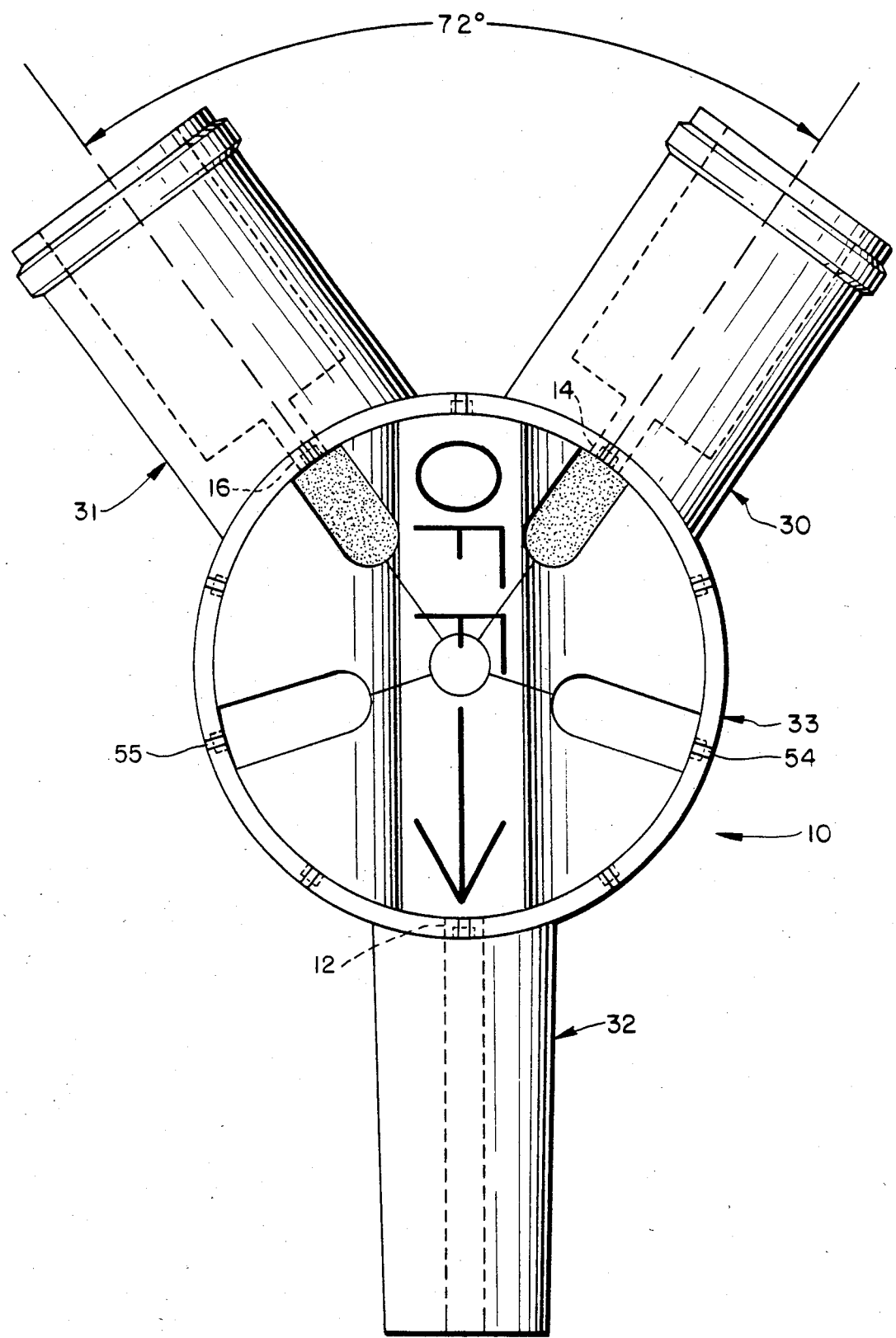

The three standard operational functions of the conventional three-way stopcock are illustrated with this novel four-way valve in FIGS. 3-5. Conventionally, only one female port may be opened to the male connector at any one time. FIG. 3 shows the valve stem position for closing off the female port 14 to connector 30, as indicated by the imprinted word OFF and the directional arrowhead. Additionally, however, the red marker 36 for the female connector 31 and the red marker 38 for the male connector 32 are clearly visible through the slots 52 and 50 respectively of the valve stem handle. Thus, ports 16 and 12 are connected, and the valve handle indicates the channels which are open as well as the ones which are closed. Turning the valve stem handle counterclockwise 72° sets the operating function for an open connection between port 14 of female connector 30 and port 12 of male connector 32, while closing off port 16 of female connector 31, as shown in FIG. 4. Again, if the valve stem is now turned an additional 144°, the operating position is set as shown in FIG. 5. In this case, port 12 of male connector 32 is no longer communicating with ports 14 and 16 for either of the two female connectors, and the operator can visually confirm at a glance that port 14 is opened to port 16.

Figure 6:
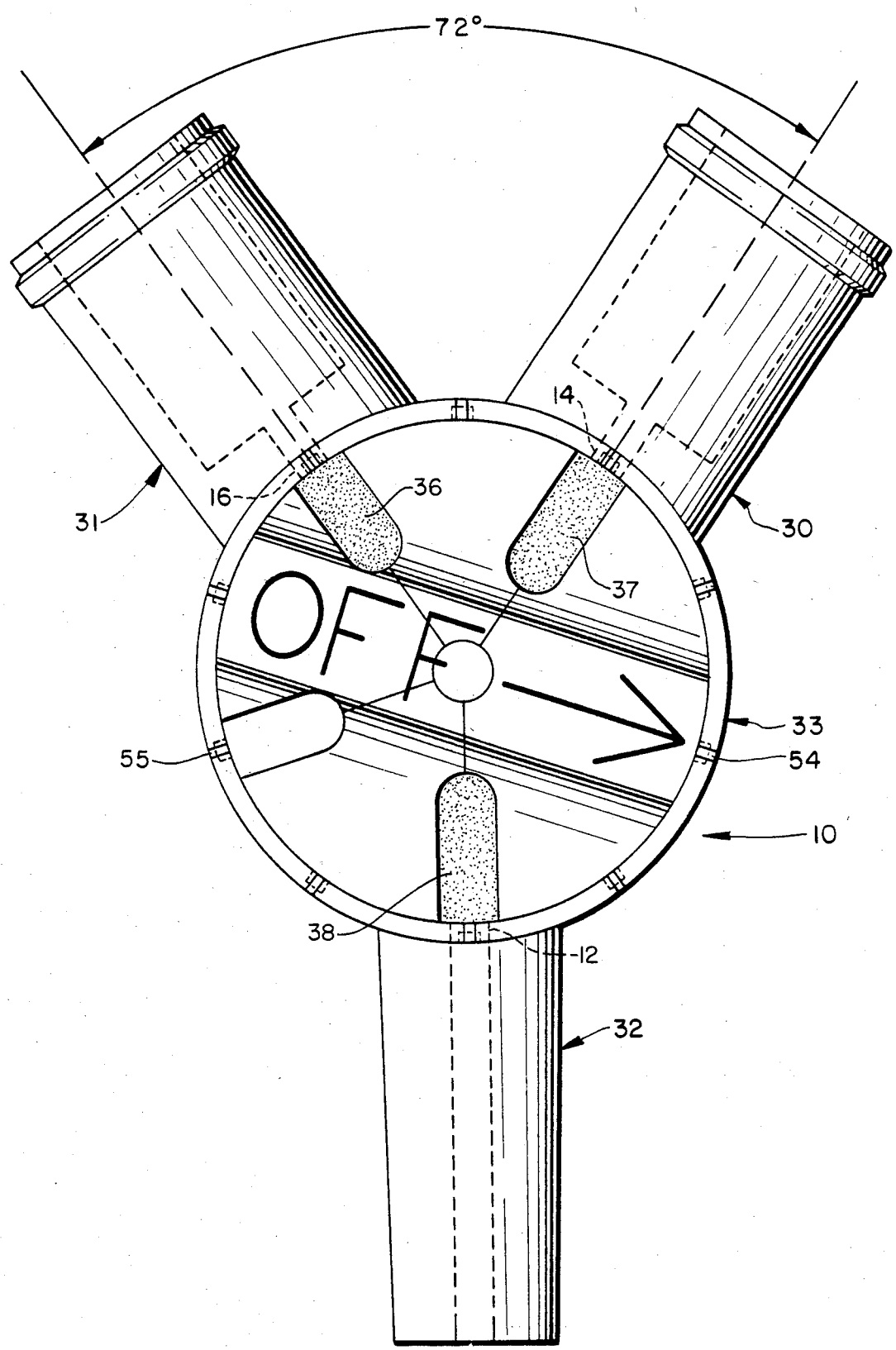
FIGS. 6 and 7 show the two operating positions for providing dual input flows through the valve.
Figure 7:
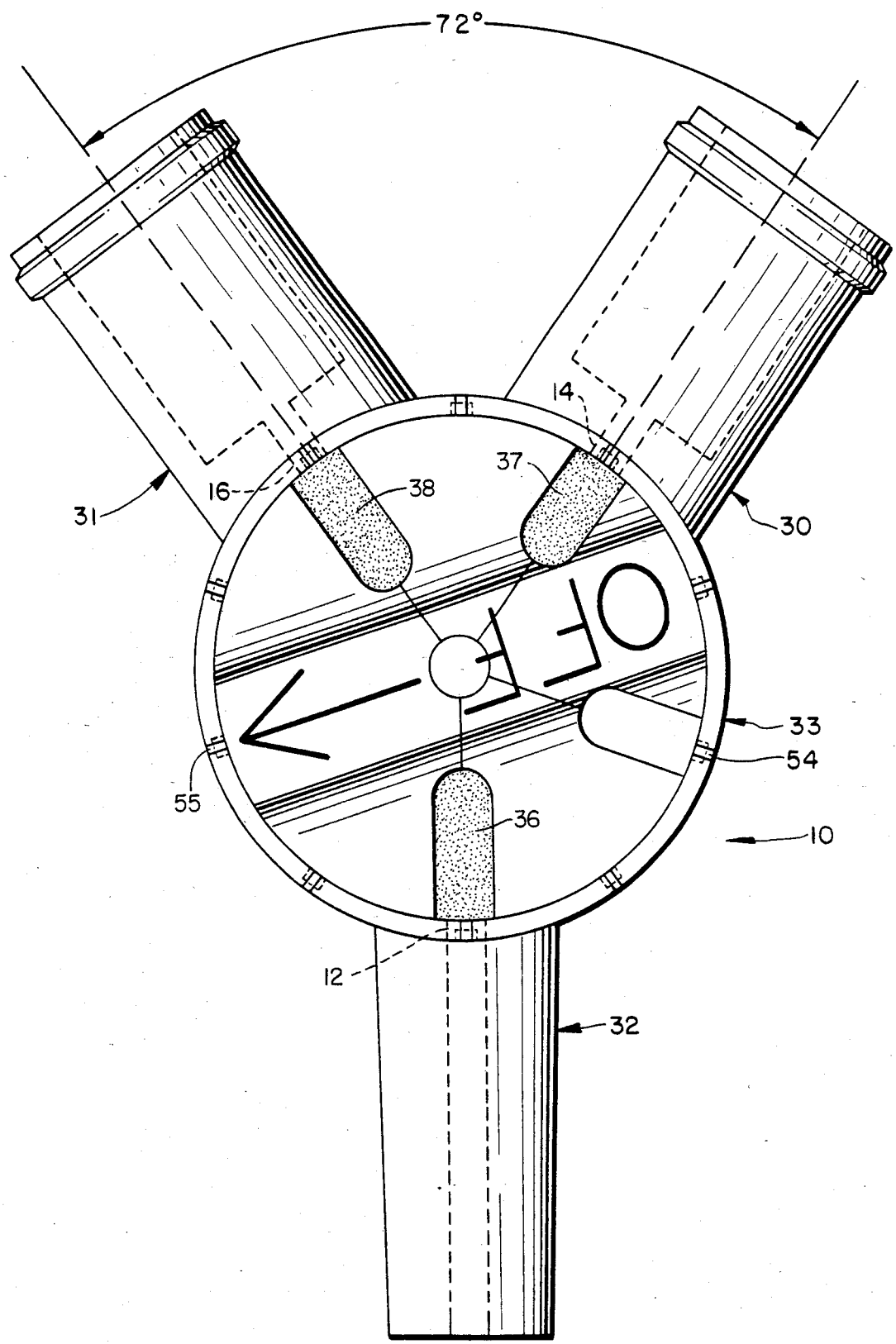
Figure 8:
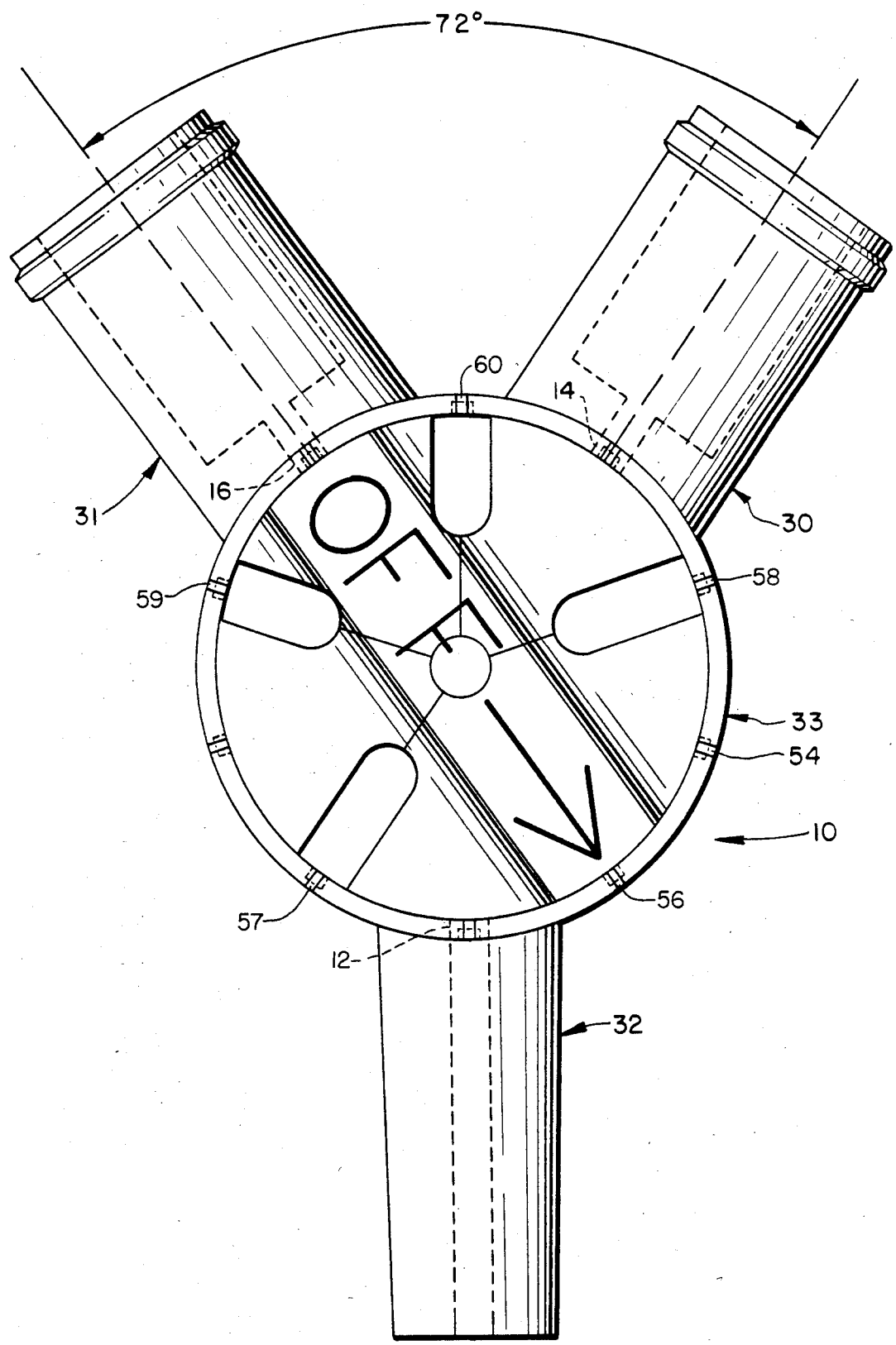
FIGS. 8-12 show the five possible positions which effectively close all three ports simultaneously.
Figure 9:
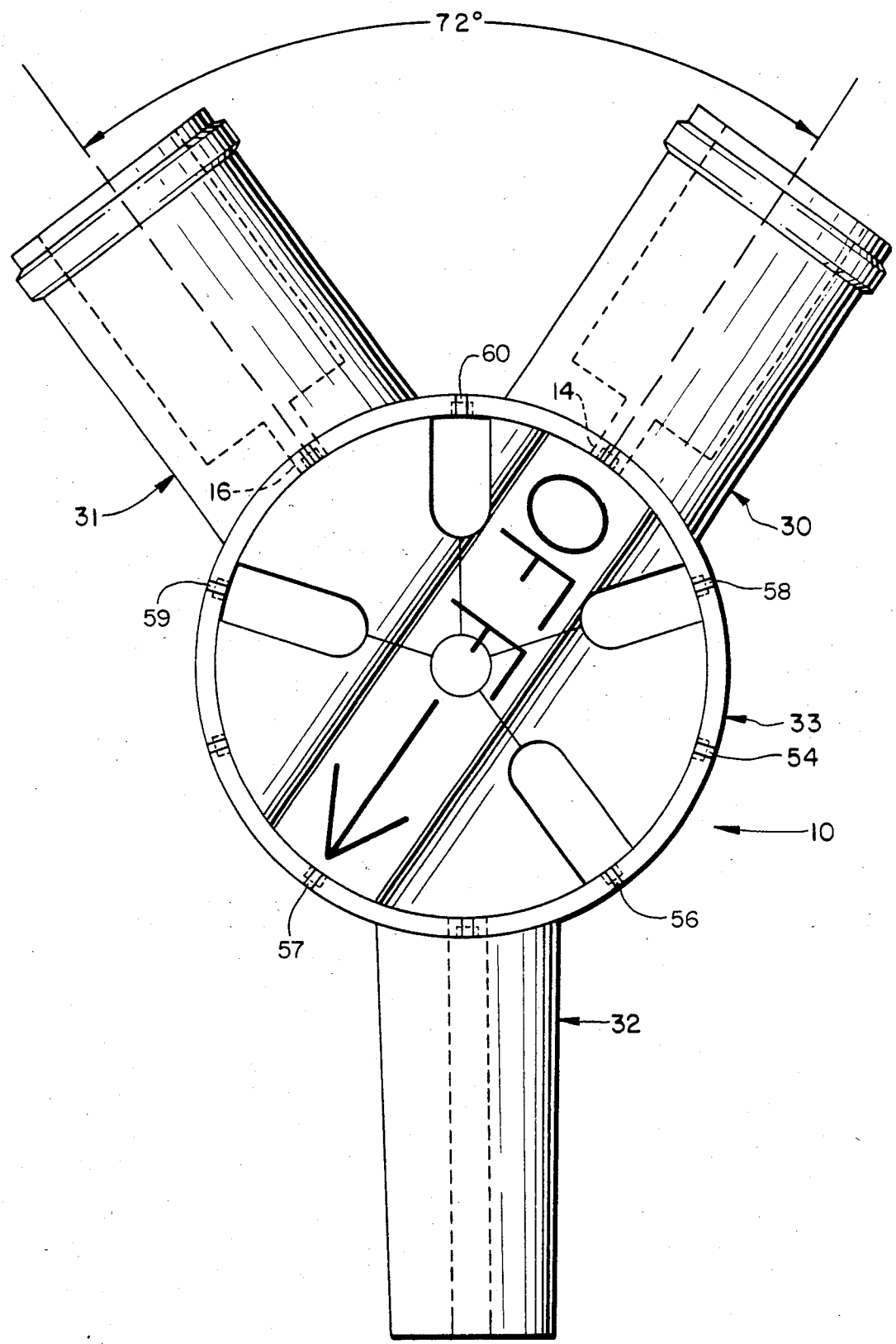
Figure 10:
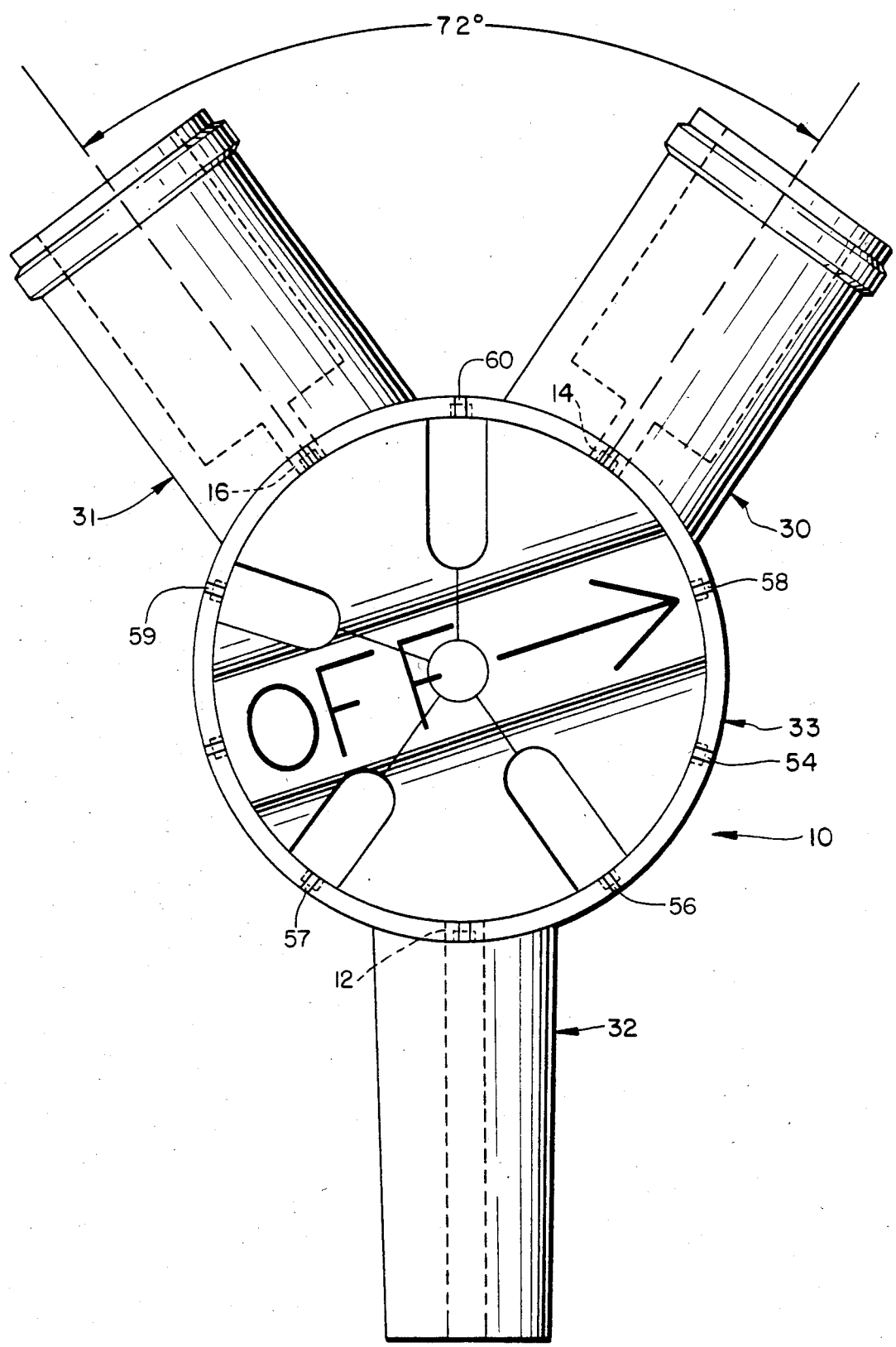
Figure 11:
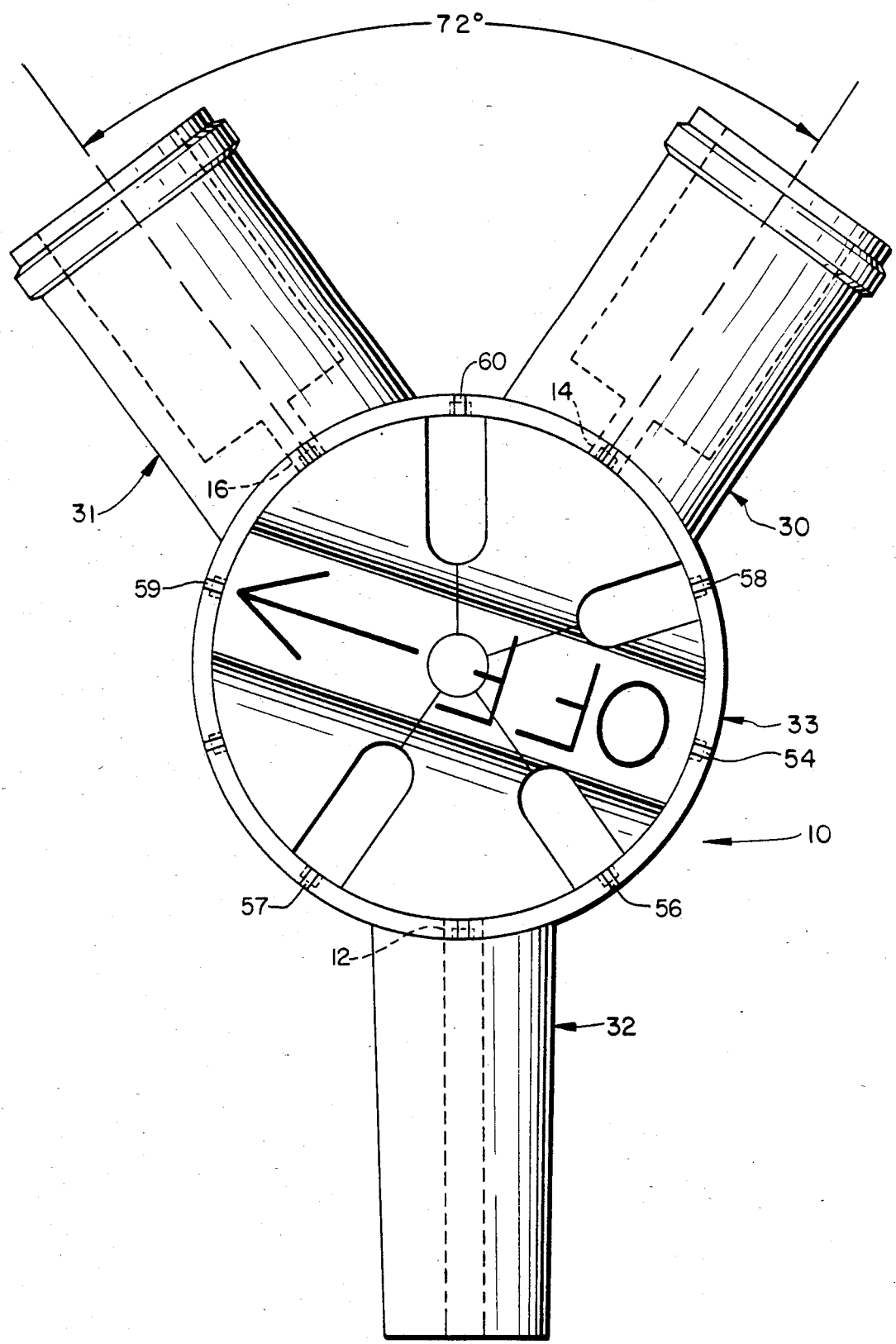
Figure 12:
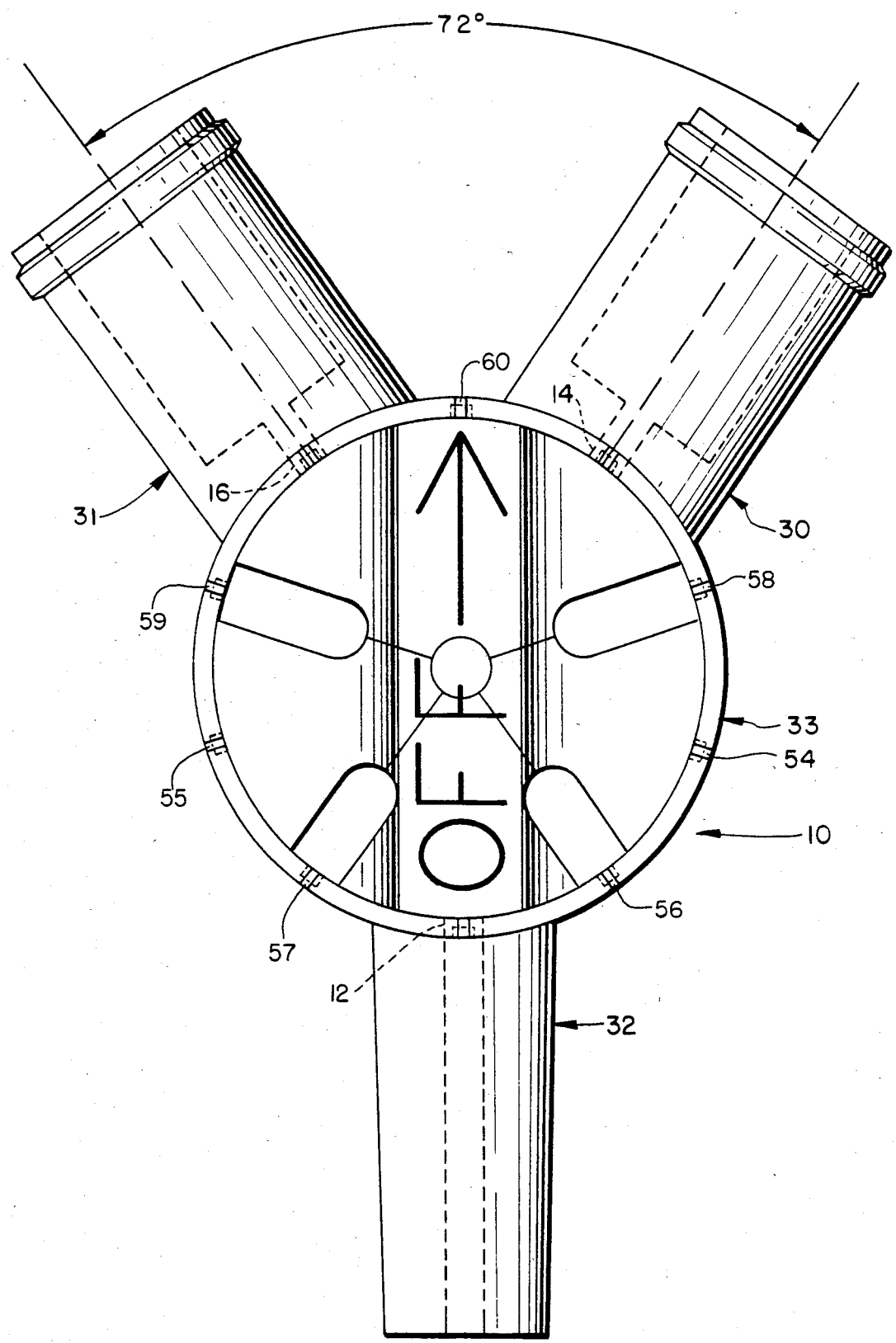

A fourth function which is not provided by the conventional three-way stopcock is shown in FIGS. 6 and 7. From the valve stem position observed in FIG. 5, turning the valve handle 72° in either direction will render visible all three red markers 36, 37, 38 indicating that both ports 14 and 16 of female connector ends 30 and 31 are in communication with port 12 of male connector 32. In these two cases, the directional indicator OFF is non-aligned with any port since it no longer points to one of the three connectors. However, the arrowhead may be used to adjust its point at either line marker or vertical slots 54 or 55 on the valve body flange 35 for "dead center" alignment with the inner conduits of the valve body.

A detent mechanism is provided to locate the valve stem in the proper position once a particular mode is selected. In this preferred embodiment as shown in FIGS. 1, 2D and 2E, the detent mechanism includes a number of recesses 70 which correspond to the ports 12, 14 and 16 and other various positions 54, 55, 56, 57, 58, 59 and 60 about flange 35, and diametrically extending rod 72 is arranged for movement within slot 76 of the valve stem finger knob 41. The openings of slot 76 are arranged to register with recesses 70 such that rod 72 will extend into opposed recesses once the desired position is selected. Coincident with each recess 70 is a vertical slot which corresponds to each of the above-noted positions 54, 55, 56, 57, 58, 59 and 60 and ports 12, 14 and 16. These slots divide the housing into ten (10) resilient parts which flex outwardly when engaged by rod 72 and return to a normal position when rod 72 registers with a recess 70. In this manner the operator can readily perceive when the proper position as selected has been reached. Furthermore, the valve will be maintained in a selected position until the resilient bias of a housing part is overcome by the operator in selecting another mode of operation.

Another function not provided by the conventional three-way stopcock is the provision for closing all three ports simultaneously. The four-way valve can provide this condition as illustrated in FIGS. 8-12. Five positions are available for this function. In each case, it is a simple matter of off-setting the valve stem 36° (one click notch of the detent mechanism) from either of the three connectors, such that none of the three red markers 36, 37, 38 are visible through the slots of the valve stem handle. Line markers 56, 57, 58, 59 or 60 correspond to those five positions where all three ports are closed. As in the previous case, the directional arrowhead of the handle may be used for precise alignment with the line markers 56, 57, 58, 59 or 60 located on the valve body flange 33.

It should be noted that the four-way valve is designed without any provisions for "dead-stops" at any of the operating positions. Experience with the conventional three-way stopcock has shown that such stops are often inadvertently over-run in which case, as a result of adverse stress of the valve body, leaks are of common occurrence. The valve stem of the four-way valve may be continuously rotated on its axis, going through a resistance change for each operating position. The unrestricted turning of the valve stem eliminates this problem. To further facilitate quick positioning of the valve stem, however, a change in sudden resistance to turning is provided by an appropriate detent mechanism with the valve stem.

It is also noted that while this four-way valve was designed with simplicity in mind, it was done without sacrificing either safety in or efficiency of operation. Also, the four-way valve achieves in doing as a simple device that which heretofore has required both the conventional three-way and four-way stopcocks. The latter, however, is very rarely used clinically because it is awkward, confusing and lacks mechanical positioning guides. Hence, for lack of a proper interconnector, it has been customary in clinical applications, for example, to administer a second intravenous fluid simultaneously with the first by introducing a needle-adapted second I.V. tubing into the first tubing, a technique which works but which leaves much to be desired in terms of patient safety. The four-way valve (stopcock) described herein would correct this deficiency as well as resolve other problems known to those versed in the use of stopcocks.

Although, the Figures show the four-way valve with some Luer-Lock type connections, it is considered to be advantageous that the valve, on a large production volume, be made with Luer-Locks on all three connectors. This would safeguard against accidental disconnections of tubing at the bedside, notably a not too infrequent occurrence in coronary intensive care units. Also, the preferred embodiment was shown as having two (2) female and one (1) male connector, but the configuration could just as easily have one female and two male connectors.

I claim:

1. A valve for clinical use in connecting tubing for administering fluids comprising:
   (a) a housing having three ports; a first port, a second port, and a third port;
   (b) said first port being spaced equi-distantly between said second and third ports, said second and third ports being spaced more closely than said first and second and said first and third ports;
   (c) selector means communicating with said ports and movable among four positions, a first position connecting said first and second ports for fluid flow while blocking flow to said third port, a second position connecting said first and third ports for fluid flow while blocking flow to said second port, a third position connecting said second and third ports and flow while blocking flow to said first port, and a fourth position blocking flow among all three ports; and (d) said selector means being movable among at least five open positions to communicate one or more housing ports with another housing port, each open position being equally spaced about said housing, and five off positions where none of the housing ports are communicated with each other, each off position being located between adjacent open positions and equally spaced about said housing.

2. The valve according to claim 1 wherein said selector means includes a shaft having four channels with each channel communicating with a port in said shaft, said channels intersecting with one another within said shaft for directing fluid among other channels.

3. The valve according to claim 2 wherein said selector means is movable among five open positions; said housing defines a cylindrical bore; said shaft being cylindrical in configuration and dimensioned for rotative fit within said bore; said shaft having said channels formed therein; said channels including a first channel communicating with a first channel port, a second channel communicating with a second channel port, a third channel communicating with a third channel port, and a fourth channel communicating with a fourth channel port, said channels communicating at a common junction within said shaft; said channel ports located to provide at said five open positions, communication: in a first position through said first and third channels, between said first and second housing ports; in a second position, through said second and fourth channels, between said first and third housing ports; in a third position, through said first and second channels, between said second and third housing ports; in a fourth position through said second, third and fourth channels, among said first, second and third housing ports; and in a fifth position corresponding to said off position, said channels being blocked from communication with any of said housing ports.

4. The valve according to claim 3 further comprising identifying means for visibly identifying which ports are open and which ports are closed.

5. The valve according to claim 4 wherein said valve includes two fourth-positions where a first, second and third housing ports are communicated with one another.

6. The valve according to claim 5 wherein said second and third ports are arranged at about 72° apart from one another and said third port is arranged about 144° between said second and third ports.

7. The valve according to claim 6 wherein said identifying means includes a reference marks located on the valve housing, and a selector mark on said valve shaft for registry with said reference marks.

8. The valve according to claim 7 wherein said reference marks include five marks for identifying the five off-positions and five marks for identifying five positions where various ports are communicated with one another.

9. The valve according to claim 8 wherein cutouts are provided in a portion of the valve shaft corresponding with said channels to identify the position of said channels relative other elements of the valve.

10. The valve according to claim 9 further comprising colored portions co-extensive with said housing ports, said cutouts being registrable with said colored portions to identify those housing ports which are communicated at any one of said five open positions of said valve.

11. The valve according to claim 10 wherein said cut-outs include four cut-outs coinciding with the four channels defined in the valve shaft.

12. The valve according to claim 11 wherein the colored portions corresponding to the housing ports include a first colored portion extending radially and registering with said first port, a second colored portion extended radially from said second port, and a third colored portion extending radially from said third port, said cut-outs being sufficient to expose said colored portions when said shaft is rotated to a position communicating one housing port to another.

13. The valve according to claim 12 wherein said identifying means includes an arrow inscribed on said valve shaft.

14. The valve according to claim 13 wherein said first, second and third housing ports are connected to first, second and third fittings respectively to enable the valve to be connected to various types of tubing.

15. The valve according to claim 14 further comprising detent means to locate said shaft at said a selected position and maintains the valve in a selected position until overcome by the operator.

16. The valve according to claim 15 wherein said detent means includes a number of recesses spaced from one another in said housing, and a member for engaging a recess corresponding to a selected position.

17. The valve according to claim 16 wherein there is one recess for every position of said valve with each recess being coincident with a corresponding reference mark and port on said housing.

18. The valve according to claim 17 wherein said member includes a rod movable within a slot formed diametrically through said valve shaft said reference marks being vertical slots permitting a part of said housing to flex outwardly upon engagement by said rod and bias said rod into a selected recess.

* * * * *